United States Patent [19]

Blalock

[11] 4,075,109
[45] Feb. 21, 1978

[54] SETTLING TANK SLUDGE COLLECTOR

[76] Inventor: Eugene D. Blalock, P.O. Box 353, Pauls Valley, Okla. 73075

[21] Appl. No.: 762,914

[22] Filed: Jan. 27, 1977

[51] Int. Cl.² ............................................. B01D 45/02
[52] U.S. Cl. .................................. 210/527; 210/532 R
[58] Field of Search ................ 210/523, 525, 527–533, 210/298

[56] References Cited

U.S. PATENT DOCUMENTS

| | | | |
|---|---|---|---|
| 2,427,091 | 9/1947 | Durdin | 210/530 |
| 2,660,557 | 11/1953 | Knowlton | 210/527 |
| 2,734,643 | 2/1956 | Knowles | 210/527 X |
| 3,498,465 | 3/1970 | Klump et al. | 210/527 X |
| 3,498,467 | 3/1970 | Hollebrandt | 210/527 |

*Primary Examiner*—William A. Cuchlinski, Jr.
*Attorney, Agent, or Firm*—Robert K. Rhea

[57] ABSTRACT

A wheel supported bridge transversely spans an upwardly open settling tank having a horizontal bottom. The bridge is automatically reciprocated by friction wheels between the ends of the tank. Support members, depending from the bridge, are pivotally connected with a scraper frame having a scraper element drawn across the tank bottom in a sludge collecting and removing action, when the bridge is moved in one direction. The scraper element is disposed in an idle position spaced above the plane of the tank bottom when the bridge is moved in an opposite direction. A counterweight, supported by the scraper element frame, maintains the scraper element in operative or idle position when the scraper frame is disposed in its respective position.

2 Claims, 7 Drawing Figures

SETTLING TANK SLUDGE COLLECTOR

BACKGROUND OF THE INVENTION

1. Field of the Invention

The present invention relates to water treatment and more particularly to a domestic water supply settling tank sludge removal apparatus.

2. Description of the Prior Art

Sludge moving apparatus of the reciprocating bridge or carriage type is in common use in water purification plants in which a scraper blade is actuated for moving sludge and released to an idling position in response to back and forth movement of the bridge or carriage.

U.S. Pat. Nos. 2,660,557 and 3,868,323 are illustrative of sludge collecting apparatus. In a water purification plant the rate of settlement of sludge to be removed, such as sand, usually settles out at a known rate and it is therefore desirable that the sludge removing apparatus be automatic and operable at predetermined times both day and night. Further, the type of drive used for reciprocating the bridge or carriage has generally been a source of trouble particularly where cables are entrained over pulleys and used for effecting the reciprocating action of the scraper or where an elongated electric current supply cable is supported by a reel and used for operating an electric motor mounted on and reciprocated with the bridge.

This invention proposes mounting the bridge or scraper support carriage on wheels guided by tracks extending along tank wall copings and wherein a reversible electric motor is connected through a transmission with a friction drive wheel, contacting the tank wall, in response to gravitational attraction for the motor and wheel mass for reciprocating the bridge at predetermined times.

SUMMARY OF THE INVENTION

A bridge frame or carriage transversely spans a rectangular settling tank and is supported for reciprocation between the ends of the tank by wheels riding on tracks. A friction drive wheel is biased toward a vertical tank wall surface at the respective ends of the bridge by gravity acting on the mass of the wheel and a driving motor connected with the respective wheel by a transmission. Electrical energy conductors are longitudinally supported above and along one side wall of the settling tank for supplying energy to the friction wheel driving motors by a conductor head supported by one end of the bridge in contact with the conductors. Vertical supports are connected with and depend from the bridge and are pivotally connected at their depending ends with a scraper frame. The scraper frame supports a scraper element extending transversely of the tank which is moved toward and away from scraping contact with the upper surface of the tank bottom by cam plates disposed at the respective ends of the tank which tilt the scraper frame toward a scraper element sludge scraping position in response to final movement of the bridge toward one end of the tank and tilts the scraper frame and scraper element away from the tank bottom when the bridge approaches the other end of the tank. A counterweight, connected with the scraper frame, maintains the scraper element in contact with or out of contact with the tank bottom in accordance with the tilted position of the scraper frame.

The principal object of this invention is to provide an automatic apparatus for removing sediments settling out of a liquid in a rectangular settling tank, or the like, in which a scraper element is reciprocated along the upper surface of the tank bottom, the scraper element being in contact with the tank bottom when moved in one direction and being raised to an idle position when moved in an opposite direction to avoid undue agitation of any solids deposited on the upper surface of the tank bottom.

DESCRIPTION OF THE PREFERRED EMBODIMENT

Figure 1:
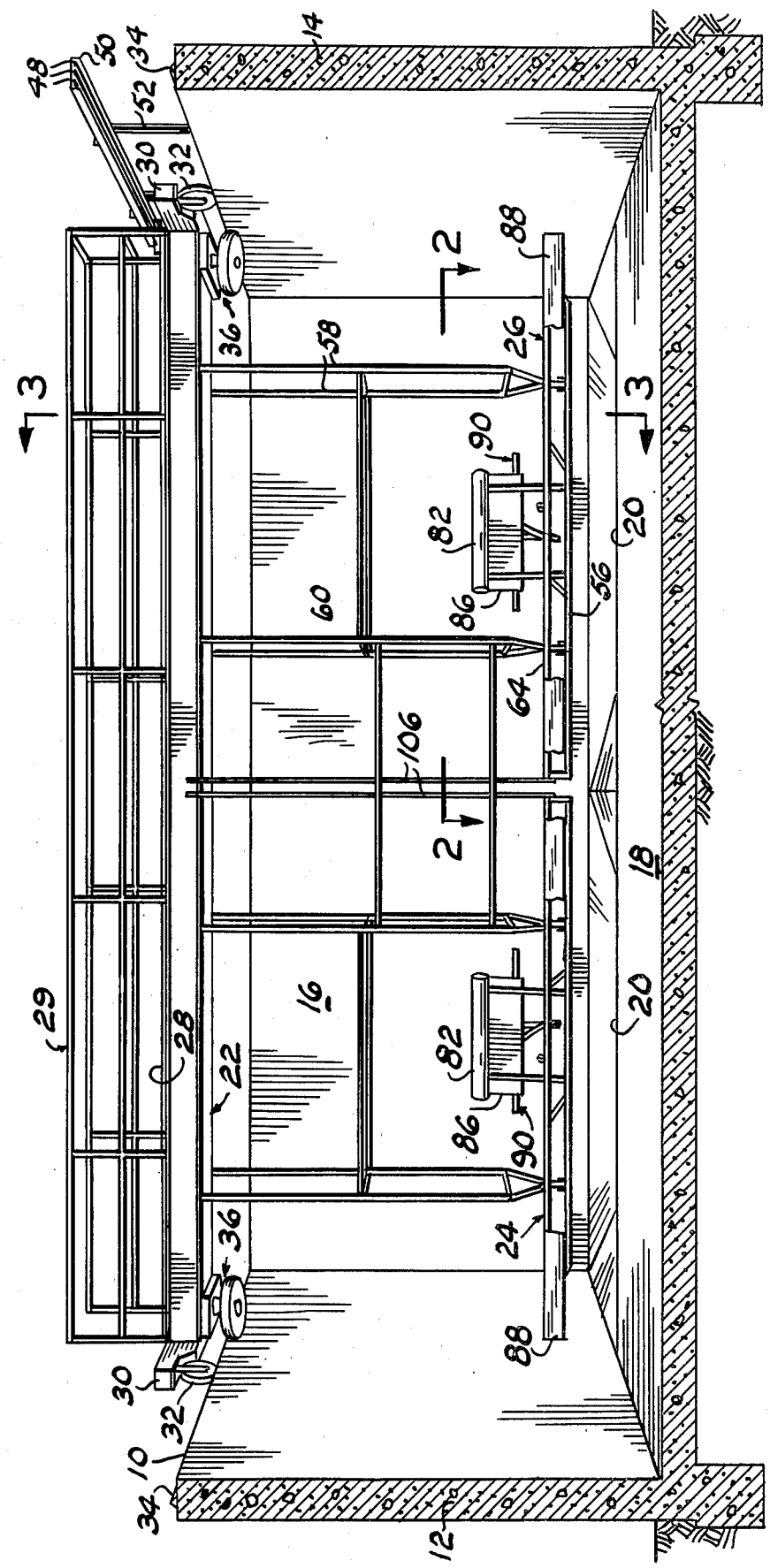
FIG. 1 is a perspective view of the apparatus when disposed adjacent the sump end of a rectangular settling tank illustrating the scraper in its lifted position, the settling tank being shown in transverse section.
Figure 2:
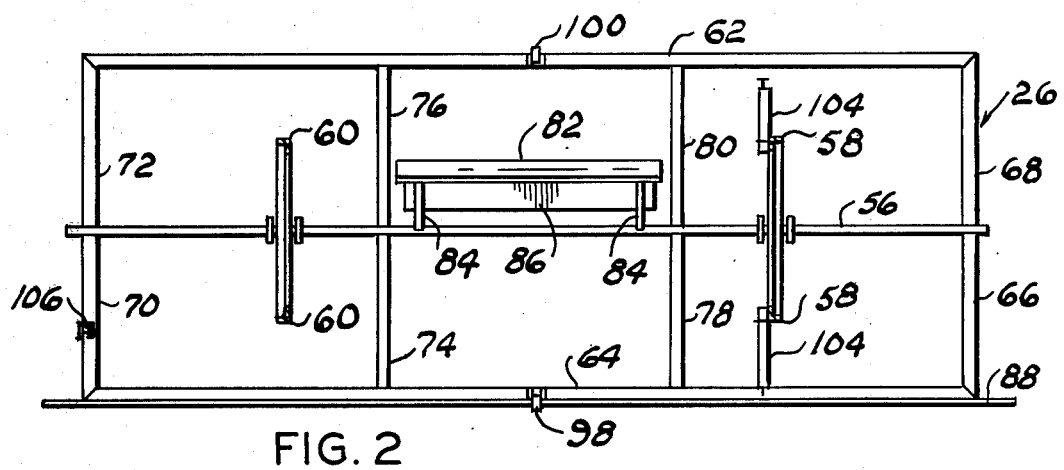
FIG. 2 is a top view, to a larger scale, of one of the scraper element support frames looking in the direction of the arrows 2—3 of FIG. 1.

Like characters of reference designate like parts in those figures of the drawings in which they occur.

In the drawings:

The reference numeral 10 indicates an upwardly open rectangular settling tank having side walls 12 and 14, end walls 16, only one being shown, and a generally horizontal bottom 18 provided, at one end, with one or more sumps 20 and drain lines 21 for collecting and draining sludge, not shown, from the tank, in the manner presently explained.

A carriage or bridge 22 transversely spans the tank and supports a pair of scraper element support frames 24 and 26, having a combined length substantially equal with respect to the inside transverse dimension of the tank, by a plurality of support members in a manner presently explained in detail. The bridge 22 is of conventional girder or truss construction and is characterized by an overlying walkway or platform 28 surrounded by guard rails 29. The bridge 22 includes a transversely disposed beam 30 at its respective ends. The respective ends of the beams 30 are supported by a caster wheel 32. The caster wheels 32 are each provided with a grooved periphery for reception and rolling contact with a rail or track 34 extending longitudinally along the upper surface or coping of the side walls 12 and 14.

Adjacent each of its ends, the bridge is provided with friction drive means 36 (FIG. 4) for reciprocating the bridge between the ends of the tank 10. The drive means 36 comprises a reversible electric motor 38 driving a gear train 40 in turn driving a pneumatic tire equipped wheel 42 frictionally contacting the inner wall surface of the respective side wall adjacent its upper limit for moving the bridge longitudinally of the tank.

Figure 7:
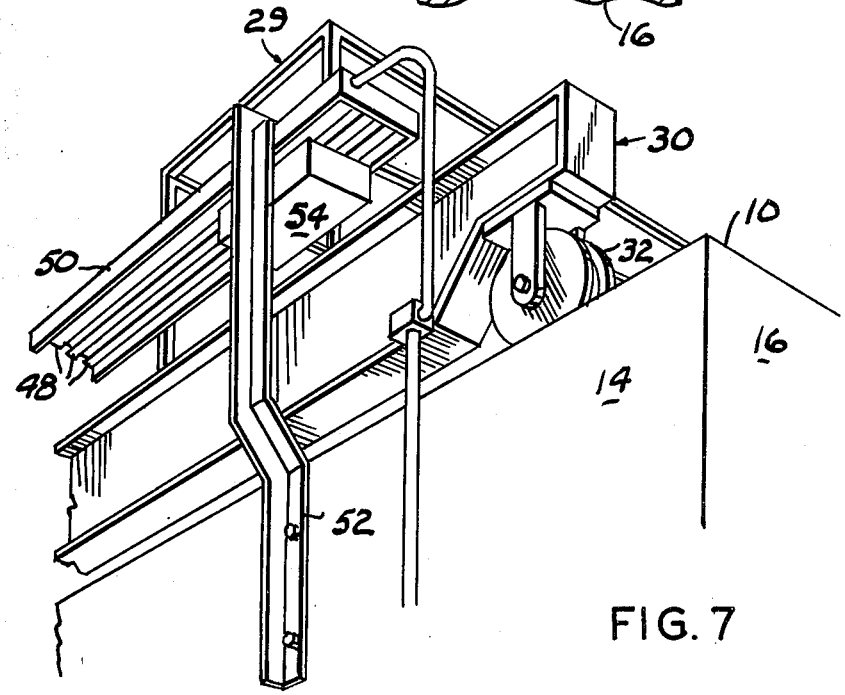

The friction drive assembly 36 is supported by a plate 44 pivotally connected by pillow blocks 45 with a drive assembly support bracket 46 secured to the depending surface of the respective end of the bridge in a manner permitting gravitational attraction for the mass of the drive assembly 36 to maintain a driving contact between the tire equipped wheel 42 and the tank wall. Current is supplied to the motors 38 from a plurality of electrical conductors 48 extending along one tank side wall, for example, the wall 14, and supported, in a suitable weather proof shield 50, in vertical spaced relation thereabove, by a plurality of power bar supports 52, the electrical energy being supplied to the motors 38 from the conductors 48 by conventional contact means 54 (FIG. 7) supported by the bridge 22 and slidably contacting the electrical conductors.

Figures 3, 5:
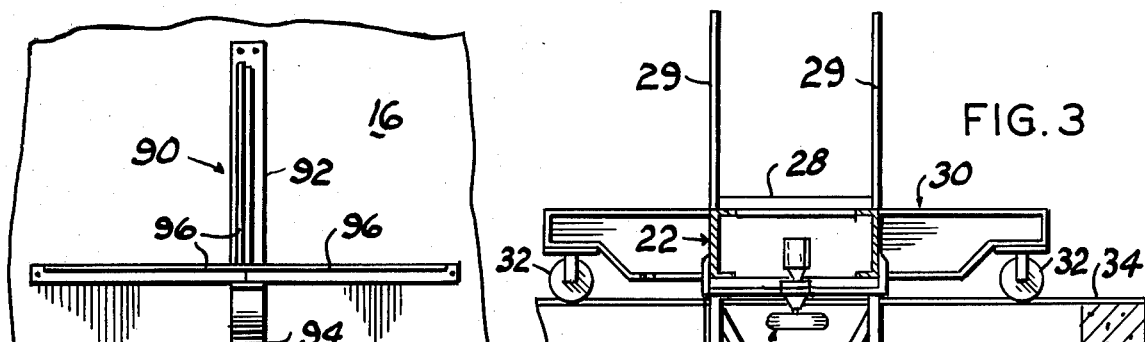
FIG. 3 is a vertical cross section, partially in elevation, of the apparatus taken substantially along the line 3—3 of FIG. 1 and illustrating the scraper in operative position.
FIG. 5 is a front elevational view, to another scale, illustrating the scraper frame tilting cam mounted on a fragment of one end wall of a settling tank.
Figure 4:
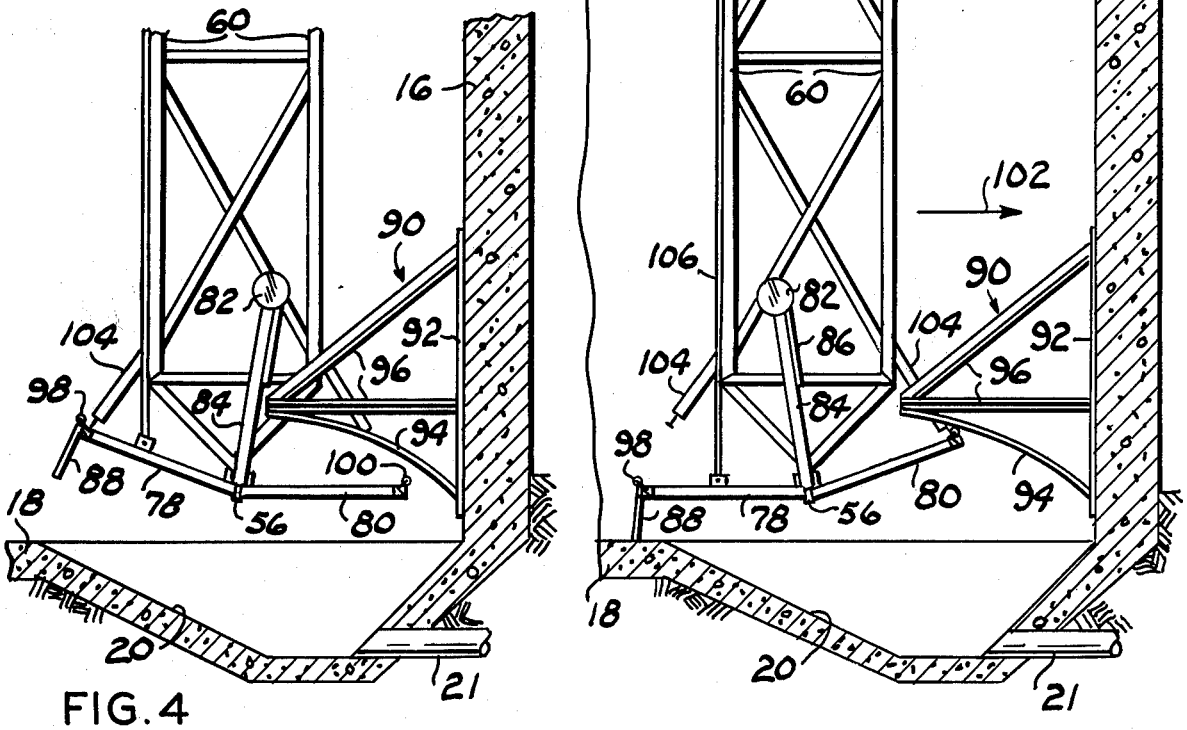
FIG. 4 is a fragmentary view of the depending portion of the apparatus shown by FIG. 3 illustrating the scraper frame tilted to an idle position.
Figure 6:
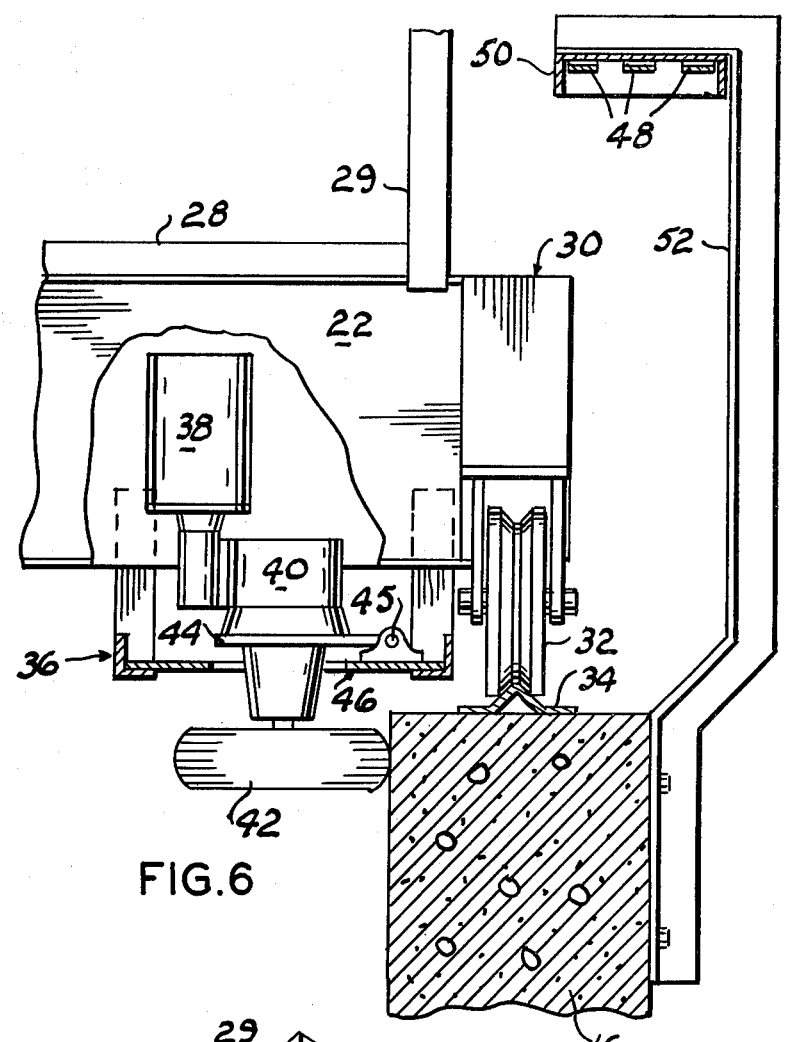
FIG. 6 is an elevational view, partially in section, to a larger scale, illustrating the friction drive wheel, its gear train equipped driving motor and mounting means in bridge driving position; and, FIG. 7 is a fragmentary perspective view of one end portion of the bridge illustrating its position with respect to one end portion of the current supply conductors.

Referring more particularly to FIGS. 2 through 5, the scraper frames 24 and 26 are substantially identical and, in the interest of brevity, only the scraper frame 26 is described in detail. The scraper frame 26, in top view, is substantially rectangular in general configuration and substantially spans one-half the inside transverse dimension of the tank 10. The frame 26 comprises a longitudinally extending center bar 56 which is pivotally connected intermediate its ends with the depending ends of two pairs of scraper frame support rods 58 and 60 secured at their upper ends to opposing sides of the bridge 22 and in spaced relation longitudinally of the bridge. The frame 26 further includes longitudinal side members 62 and 64 secured to the rod 56 by two pairs of end members 66–68 and 70–72 and two pairs of transverse braces 74–76 and 78–80. An elongated cylindrical-like counterweight 82 is longitudinally secured to the frame bar 56 medially its ends by a pair of counterweight supports 84 and a panel or plate 86 extends between and is secured to the counterweight supports 84 at their upper end portions. The pairs of scraper frame end members and pairs of scraper frame intermediate members are secured to the frame rod 56 in a manner to form an angle between the respective end member and cross brace and a vertical plane defined by the counterweight supports 84 of slightly less than 90° so that, as shown in FIGS. 3 and 4, when the end members 66 and 70 and brace members 74 and 78 are disposed in a substantially horizontal plane, the plane defined by the other end members 68 and 72 and brace members 76 and 80 will be inclined upwardly and vice versa.

A scraper blade 88 is longitudinally secured, in depending relation, to the frame side member 64, for contacting the upper surface of the tank bottom for sludge removal in a scraping action when the bridge is moved toward the sumps 20, as presently explained. The scraper 88 is maintained in contact with the tank bottom by the counterbalance 82 when the scraper frame and counterbalance are tilted to the position shown by FIG. 3. The scraper blade 88 may be a unitary member formed from any desired material or provided with a longitudinally extending replaceable depending edge portion, not shown, formed of resilient material thus compensating for irregularities of the upper surface of the tank bottom.

Scraper frame tilting means 90 is connected with the inner surface of the respective tank wall 16 for tilting the scraper frame from the position shown by FIG. 3 to the position shown by FIG. 4 and vice versa. The tilting means 90 includes a strap-like base plate 92 vertically secured to the tank wall 16. An arcuately curved plate 94 is secured at one end to the depending end portion of the plate 92 and is secured at its other end to cooperating ends of brace members 96 disposed in spaced relation with respect to the inner surface of the tank end wall 16 and projecting, in diverging relation, at their other ends toward and secured to the tank end wall.

Rollers 98 and 100 are journalled by the respective scraper frame side members 62 and 64 in position for contacting the cam plate 94 as the bridge is moved toward the respective end wall 16. As shown by FIG. 3, when the bridge and scraper frame is moving in the direction of the arrow 102 the roller 100, contacting the cam plate 94, vertically tilts the scraper frame 26 about the longitudinal axis of the bar 56 until the counterweight 82 moves beyond a vertical plane taken through the scraper frame center bar 56 so that the counterweight 82, by gravity, disposes the frame brace member 80 horizontally. As shown by FIG. 4, tilting movement of the scraper frame and counterweight in this direction is interrupted by a stop 104 secured to the depending end portion of one of the scraper frame supports and projecting toward the respective scraper frame side members 62 and 64.

Obviously, the tank may be provided with a sump at each of its ends and a scraper blade may be attached to the other scraper frame side member 62 to sweep sludge toward the tank ends during the respective direction of movement of the bridge.

A pair of elongated rods 106, or the like, are respectively connected at their depending ends with the scraper frame 24 and 26 so that the position of the upper end limit of the respective rod, with respect to indicia on the adjacent side surface of the bridge 22, provides visual indication of the direction of tilt of the scraper frames about the longitudinal axis of the frame bar 56.

A conventional timer, not shown, is interposed in the electric wiring circuit to the motor and connected with a solenoid operated drain valve, not shown, interposed in the drain line 21, for opening and closing the valve, for the purposes of reciprocating the bridge between the ends of the tank 10 and draining the sumps 20 at predetermined times.

OPERATION

In operation, with the apparatus installed as described hereinabove its operation is automatic and it is substantially trouble free over extended periods of time. At a predetermined time current is applied to the electric motors 38 which drive the friction wheels 42 and moves the bridge and its components toward one end of the tank 10. Assuming the direction of movement of the bridge to be in the direction of the arrow 102 (FIG. 3), the scraper 88, having moved along the upper surface of the tank bottom 18, drags any collected sludge, not shown, toward and deposits it on the inclined surface of the sump 20 while continued movement of the bridge, in the direction of the arrow 102, establishes contact between the scraper frame roller 100 and the cam plate 94 until the counterweight has been tilted beyond the vertical toward the right, as viewed in FIGS. 3 and 4, and the scraper frame 26 is disposed in the position of FIG. 4 wherein the scraper blade 88 is disposed in vertical spaced relation with respect to the tank bottom 18. At this point limit switches, not shown, in the electrical circuit, have been activated to interrupt movement of the bridge in its previous direction of travel. This bridge stopping action simultaneously reverses the direction of the motors 38 so that the bridge will be moved by the friction wheels 42 toward the other end of the tank where the tilting movement or action of the scraper frames, is repeated by the camming means 90 at the opposite end of the tank to again dispose the scraper blade 88 in contact with the tank bottom.

Obviously, the timer may discontinue movement of the bridge for a predetermined time interval according to the rate of settlement of impurities toward the tank bottom. Similarly, the timing means opens the drain valve to flush sludge out of the sump at predetermined times.

Obviously the invention is susceptible to changes or alterations without defeating its practicability. Therefore, I do not wish to be confined to the preferred embodiment shown in the drawings and described herein.

I claim:

1. A sludge and sediment collector for a longitudinal settling tank having a flat bottom and having a sump adjacent one of its ends, comprising:

bridge means transversely spanning said tank and operable for reciprocating movement between its ends;

friction wheel drive means for reciprocating said bridge means, said friction drive means including a drive support bracket connected in depending relation with the respective end of said bridge means, a reversible motor operatively connected with a source of electrical energy, a pneumatic tire equipped wheel connected with and driven by said motor about an axis generally parallel with respect to the vertical plane of the respective bridge supporting tank wall, and, means including a plate pivotally connecting said wheel with said support bracket in a manner permitting gravitational attraction for the mass of said wheel and said motor to maintain said tire in frictional driving contact with the adjacent tank wall surface;

sludge scraping means generally horizontally supported by said bridge means adjacent the upper surface of said tank bottom for vertical tilting movement about a horizontal axis from a sludge collecting position during movement toward said sump to an idle position during movement away from the sump, said sludge scraping means including a rectangular scraper frame having a center bar extending transversely of said tank and having longitudinal side members, said scraper frame having a pair of end members and a pair of transverse braces connecting one said frame side member with said center bar in a horizontal plane and connecting the other said frame side member with said center bar in a plane inclined upwardly with respect to the horizontal when said scraper frame is in one position, and, a scraper blade secured to one said scraper frame side member; and, cam plate means including an elongated arcuately curved plate secured at one end to the inner surface of the respective tank end wall and projecting, at its other end, toward an intermediate portion of the respective said scraper frame side member a distance sufficient for contacting the respective scraper frame side member when in one position and tilting said frame to the other of its positions.

2. The sludge and sediment collector according to claim 1 and further including:

counterbalance means supported by said scraper frame for maintaining said scraper frame in its respective tilted position during movement between the ends of said tank.

* * * * *